(12) United States Patent
Virkki

(10) Patent No.: US 7,835,968 B1
(45) Date of Patent: Nov. 16, 2010

(54) METHODS, SYSTEMS AND PROGRAM PRODUCTS FOR MARKET ANALYSIS

(76) Inventor: Seppo Sakari Virkki, Mechelininkatu 26 A 22, FI-00100 Helsinki (FI)

(*) Notice: Subject to any disclaimer, the term of this patent is extended or adjusted under 35 U.S.C. 154(b) by 534 days.

(21) Appl. No.: 11/709,052

(22) Filed: Feb. 22, 2007

Related U.S. Application Data

(60) Provisional application No. 60/783,863, filed on Mar. 21, 2006.

(51) Int. Cl.
*G06Q 40/00* (2006.01)
(52) U.S. Cl. .................... 705/36 R; 705/35; 705/37
(58) Field of Classification Search .............. 705/35, 705/36 R, 37
See application file for complete search history.

(56) References Cited

U.S. PATENT DOCUMENTS

| | | | | |
|---|---|---|---|---|
| 6,453,303 | B1* | 9/2002 | Li | ............... 705/36 R |
| 2003/0009399 | A1* | 1/2003 | Boerner | ............ 705/35 |
| 2005/0149423 | A1 | 7/2005 | Roseme et al. | |
| 2005/0228735 | A1 | 10/2005 | Duquette | |

OTHER PUBLICATIONS

S&P: Time Ripe to Securitize Life Insurance Policies PR Newswire. New York: Oct. 24, 2001. p. 1.*

Fitch Rates Metro Washington Airports Auth, D.C. $13.6MM Bonds 'AA- '; Stable Outlook Business Wire. New York: Aug. 10, 2004. p. 1.*

* cited by examiner

*Primary Examiner*—Lalita M Hamilton
(74) *Attorney, Agent, or Firm*—Oliff & Berridge, PLC

(57) ABSTRACT

A method, data processor and program product, for performing an analysis of one or more instruments and/or one or more actors acting on the one or more instruments. In one embodiment a competence measure $C_{ij}$ is computed for at least one pair of instrument i and actor j; wherein i is an index which runs through the one or more instruments and j is an index which runs through the one or more actors; and wherein said computing the competence measure $C_{ij}$ of actor j on instrument i comprises maintaining a cumulative sell value$_{ij}$ and a cumulative purchase value$_{ij}$ respectively based on sell values$_{ij}$ and/or purchase values$_{ij}$, and computing a value which is about equal to:

$$\frac{(\text{cumulative sell value}_{ij} - \text{cumulative purchase value}_{ij})}{\text{minimum of}}$$

$(\text{cumulative sell value}_{ij}, \text{cumulative purchase value}_{ij}).$

39 Claims, 2 Drawing Sheets

METHODS, SYSTEMS AND PROGRAM PRODUCTS FOR MARKET ANALYSIS

This nonprovisional application claims the benefit of U.S. Provisional Application No. 60/783,863, filed Mar. 21, 2006.

BACKGROUND OF THE INVENTION

The invention relates to methods, systems and program products for one or more analyses in respect of tradable instruments. Illustrative but non-restricting examples of tradable instruments include stocks, futures, warrants, bonds, currencies, options, commodities, and real estates, as well as any comparable instruments having a market from which data is available.

Prior art market analysis techniques can be classified into two major types. One type of techniques is generally known as a fundamental analysis. It is based on a tally of accountable assets of the firm which the instrument relates to. The other type is known as a technical analysis. In technical analysis, predicting an instrument's future is based on the same instrument's history. These types of market analysis techniques are extensively covered in literature. Also, published US patent application 2005/0228735 (Douglas Ray Duquette) and 2005/0149423 (Stephen Roseme) provide explanations of these techniques.

Either type of prior art market analysis techniques faces profound restrictions. For instance, both types of prior art market analyses are based on the analyst's evaluation of available data, and such evaluation is seldom 20, objective. Instead, the analyses are frequently performed by persons who themselves act on the tradable instruments. The actors' personal competence and interests influence the quality of the analyses. Furthermore, the prior art market analysis techniques fail to utilize some of the available information.

BRIEF DESCRIPTION OF THE INVENTION

An object of the invention is to develop methods, systems and program products for market analysis so as to alleviate at least some of the restrictions of the prior art market analysis techniques. The object is achieved by methods, systems and program products as specified in the attached independent claims. The dependent claims disclose specific ways to implement the invention.

The invention can be realized in various embodiments, as will be described later in more detail. A common feature of all embodiments is the use or creation of information which in the prior art techniques has not been used in analyses of instruments and/or actors acting on the instruments.

Terminology

The description of the present invention uses the following terminology.

"Tradable instrument" or "instrument", which terms are used synonymously herein, means an item which is traded in one or more markets from which data is available. Illustrative but non-restricting examples of (tradable) instruments include stocks, futures, warrants, bonds, currencies, options, commodities and real estates, as well as any comparable instruments having a market from which data is available.

"Transaction" is an event which changes or has a potential to change the value and/or ownership of an instrument. A typical form of transactions is an event in which a purchasing actor purchases a batch of instruments from a selling actor, for the purposes of capital gain. The term "transaction" is also used in the context of databases, wherein it means a well-defined procedure for entering or altering database contents. However, unless expressly stated otherwise, the description of the present invention uses the term "transaction" only in the first-described context of instruments.

"Transaction record" is a data tuple which directly or indirectly indicates a number of instruments and information which affects or has the potential to affect the price of the instruments. In a purchase transaction, for example, the transaction record typically indicates a purchasing actor, a selling actor, the number and type of instruments involved, purchase price and date, as is well known to readers familiar with stock exchange procedures.

"Actor" means any entity involved in transaction(s) of tradable instrument(s) in one or more markets. Illustrative but non-restricting examples of actors are individual investors, institutional investors, brokerages, brokers, banks, funds, etc.

"Analysis" is a term used in its conventional meaning. An analysis processes input data to a result. Illustrative but non-restricting examples of results include ratings, rankings and recommendations.

"Combination" is an act or a result of an act wherein several input values each contribute to an output value. Computationally simple combinations include a sum or product of a set of input values, but the inventor has determined by computer simulations that useful results can be obtained by combinations which do not conform to any mathematically simple expressions. For instance, some or all of the combinations of this invention can be generated by trained neural networks, in which case it is not even possible to formulate any exact relations between the input and output values. In most cases where the most intuitive operator is a mathematical sum or difference, any combination which has a 0.5 or better correlation with a sum or difference, respectively, of the operands is sufficient. Somewhat better results can be obtained by higher correlations, such as 0.6, 0.7, etc., up to 1.0.

Likewise, in cases where the most intuitive operation is a mathematical multiplication, any combination which has a 0.2 or better correlation with a product of the operands is sufficient. Again, slightly better results can be obtained by higher correlations, such as 0.3, 0.4, 0.5, etc., up to 1.0.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

Figure 1:
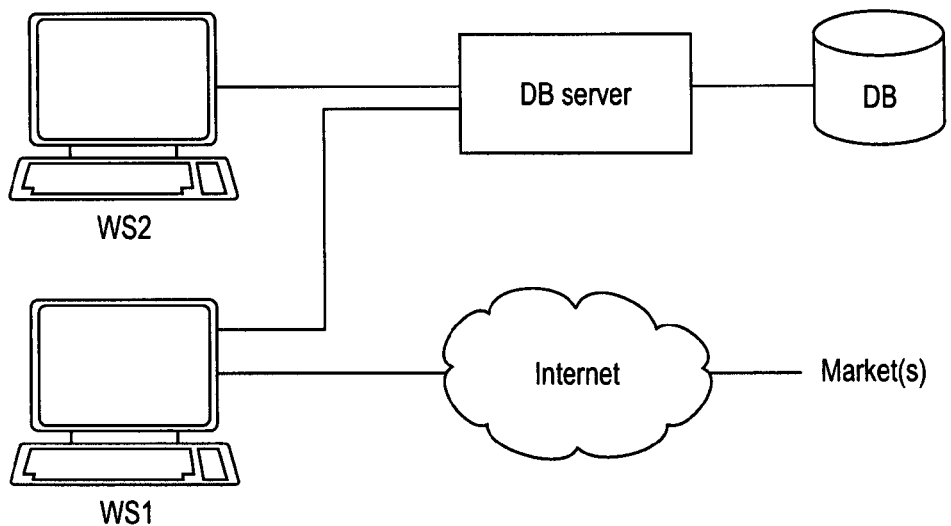
FIG. 1 is a block diagram of a system architecture in which the invention can be used.

FIG. 1 is a block diagram of a system architecture in which the invention can be used. This system architecture supports all embodiments, and the differences between the embodiments relate to the processing logics. The system comprises a large database DB for storing history data on tradable instruments, actors, transaction history and the like. A database server contains a powerful database engine and preferably a sufficient amount of random access memory to perform all database operations without disk input/output. This is because in practice the system will be used to track transactions of a large number of tradable instruments over a long period of time by a large number of actors. The database server is coupled to workstations, two of which are shown by way of example. Workstation WS1 is coupled to the markets of the tradable instruments, such as New York Stock Exchange (NYSE), for obtaining information on transactions of tradable instruments by the actors. Workstation WS1 stores such information, after some optional post-processing, via the database server to the database DB. Workstation WS2 is a representative example of a man-machine interface. The various processing logics required by the embodiments of the invention can be installed in one or more of the workstations WS1, WS2 or in the database server.

Figure 2:
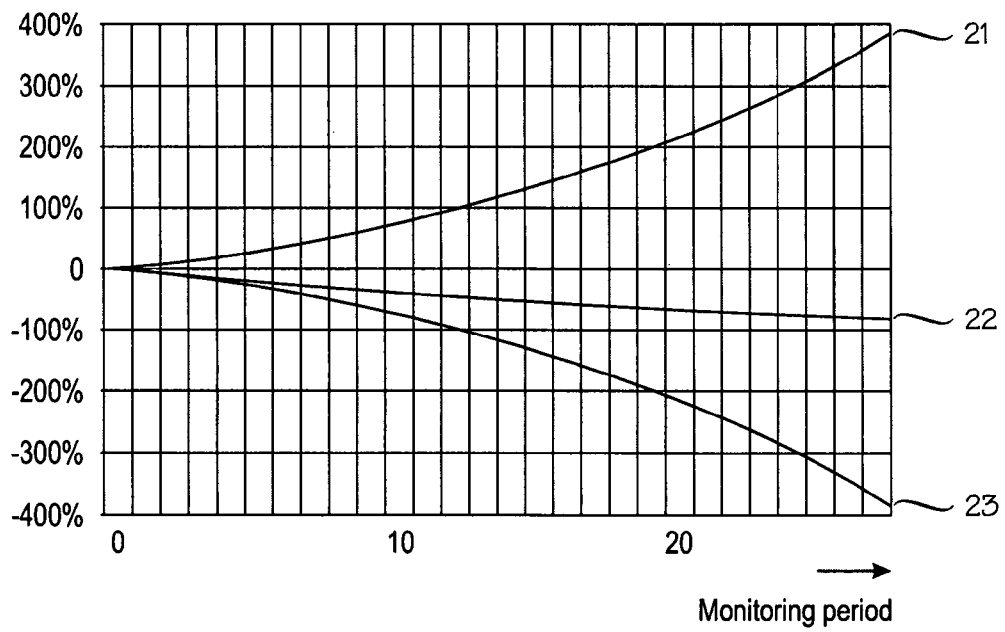
FIG. 2 illustrates symmetry inversion.

FIG. 2 illustrates symmetry inversion over 28 monitoring periods. Curve 21 illustrates a cumulative profit assuming a constant 6% profit per period. Curve 22 illustrates a cumulative loss assuming a constant 6% loss per period. Finally, curve 23 illustrates a cumulative symmetry-inverted loss under the same assumption as curve 22, ie, a 6% loss per period. It will be appreciated that the values indicated by curves 21 and 22 are poorly comparable because traditionally-calculated percentage profits by far outweigh traditionally-calculated percentage losses. But the symmetry-inverted loss curve 23 is a mirror image of the profit curve 21, whereby profits and losses are easily comparable. In the following, this operation makes the competence space symmetric.

Figure 3:
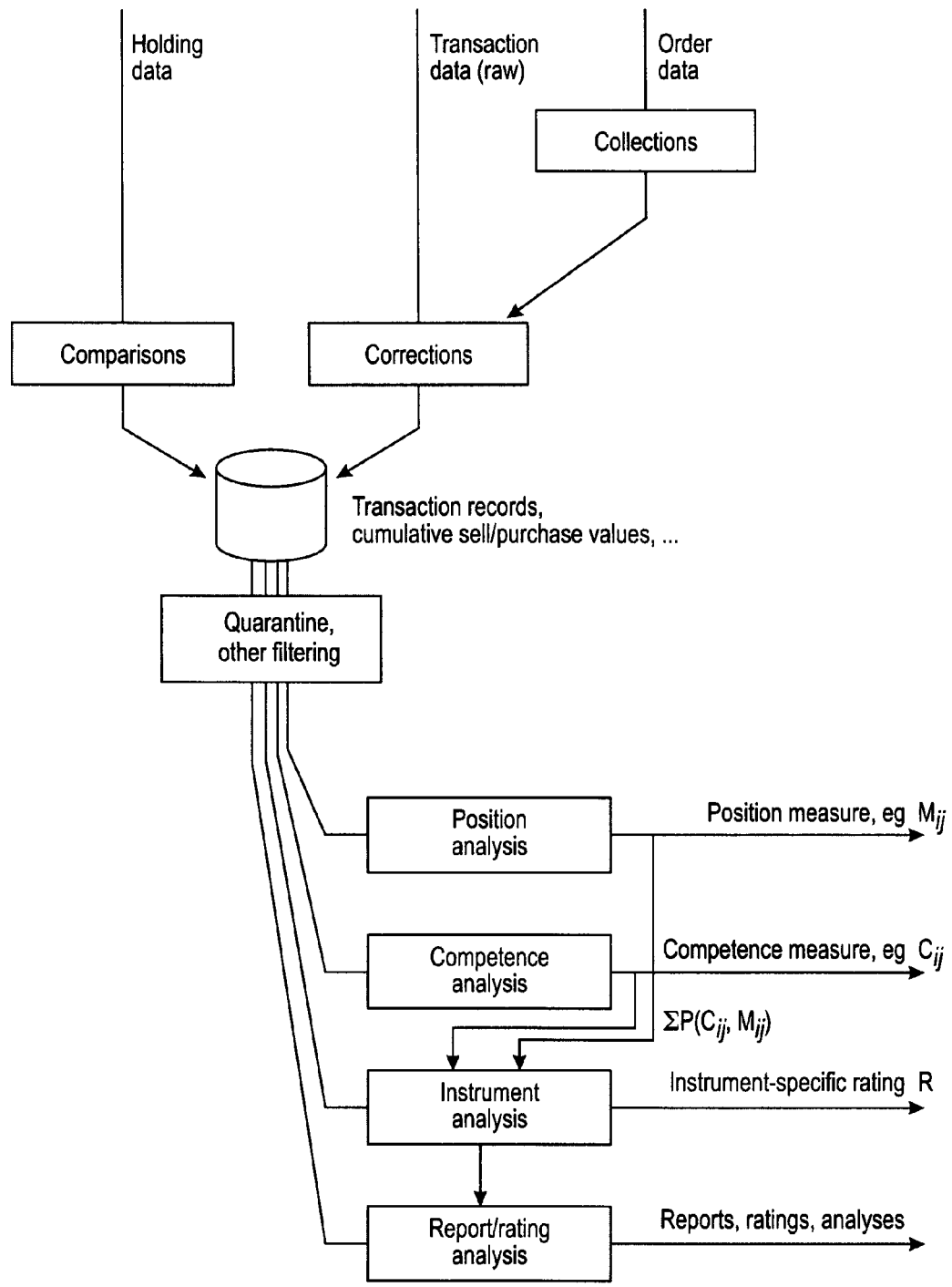
FIG. 3 is a flow diagram depicting information flows in a system which implements several embodiments of the invention simultaneously.

FIG. 3 is a flow diagram depicting information flows in a system which implements several embodiments of the invention simultaneously. The Internet connection to the one or more markets shown in FIG. 1 provides the initial input information to the information flow shown in FIG. 3. In this example, the initial input information comprises raw transaction data (if available) and/or holding data. Raw transaction data is not very useful as such, and must be corrected for any applicable split, reverse split, dividend, option, covered option, convertible loan, capital loan, bond, debenture, issue, redemption, bankruptcy, listing, future, merger, spin-off, delisting, initial purchase offering and/or any act which affects or has a potential to affect the value of the instruments. After such corrections, the transaction data is stored in a database as organized transaction records. But in many cases even raw transaction data may not be available, or is only available as each actor's internal information. Making comparisons of consecutive holding data is another way to obtain transaction records.

The transaction records may be used as a basis for various analyses and reports. In addition, they may be used to determine the cumulative purchase value and cumulative sell value of each pair of actor and instrument. A position analysis provides a position measure for pair of actor and instrument. A competence analysis provides a competence measure for pair of actor and instrument. A combination P, such as a product or any operator which has a sufficient correlation with a product, of the competence measure Cij and position measure Mij of actor j and instrument i, provides a competence-position measure P(Cij, Mij) for the pair of actor j and instrument i. Another combination Σ over all actors, such as a sum or any operator which has a sufficient correlation with a sum, of the competence-position measures provides an instrument-specific indicator ΣP(Cij, Mij). As used herein, "all actors" and "all instruments" mean a collection of actors and instruments actually used in calculations. For instance, data for an actor or instrument may be available but is filtered out by some quarantine criteria.

First Embodiment

A first embodiment of the invention is a method for a data processor, for performing an analysis of one or more instruments and/or one or more actors acting on the one or more instruments; the method comprising computing a competence measure $C_{ij}$ for at least one pair of instrument i and actor j;

wherein i is an index which runs through the one or more instruments and j is an index which runs through the one or more actors;

wherein said computing the competence measure $C_{ij}$ of actor j on instrument i comprises maintaining a cumulative sell value$_{ij}$ and a cumulative purchase value$_{ij}$ respectively based on sell values$_{ij}$ and purchase values$_{ij}$, and computing a value which is about equal to:

$$\frac{(\text{cumulative sell value}_{ij} - \text{cumulative purchase value}_{ij})}{\text{minimum of}}$$
$$(\text{cumulative sell value}_{ij}, \text{ cumulative purchase value}_{ij}).$$

The expression "minimum of" in the divisor means a function or operator which returns the smaller (smallest) of its arguments. The technical significance of the minimum function is as follows. This embodiment aims at combining the historical transactions of actor j on instrument i in a sensible manner. But combining percentage profits and percentage losses in a sensible manner is not trivial because losses have an upper limit of 100%, while profits have no upper limit. The inventor has realized that percentage losses can be made comparable to percentage profits by symmetry inversion, in which, say, a 50% (1 to 2) loss is comparable to a 100% (2 to 1) profit. The above formula means that for an actor j whose cumulative gains on instrument i are positive, the above formula is equivalent to:

$$\frac{(\text{cumulative sell value}_{ij} - \text{cumulative purchase value}_{ij})}{\text{cumulative purchase value}_{ij}}$$

And for an actor j whose cumulative earnings on instrument i are negative, the formula is equivalent to:

$$\frac{(\text{cumulative sell value}_{ij} - \text{cumulative purchase value}_{ij})}{\text{cumulative purchase value}_{ij}}$$

It will be appreciated that use of the cumulative purchase value as the divisor for profits and the cumulative sell value as the divisor for losses provides the required symmetry inversion, whereby a 2 to 1 gain and 1 to 2 loss are equal in magnitude and cancel each other out.

An aspect of the first embodiment is a data processing system comprising means for carrying out the method according to claim 1. Yet another aspect of the first embodiment is a program product which is installable in a data processing system such that execution of the program product causes the data processing system to carry out the method according to claim 1. The first embodiment of the invention generates a novel type of instrument-actor-specific competence measure which provides useful information in an analysis of one or more instruments and/or one or more actors acting on the one or more instruments. For example, a potential investor receives recommendations by several analysts but is not sure how to combine the recommendations by the analysts. The instrument-actor-specific competence measure can be used to weigh the ratings or recommendations of the analysts such that the analysts' competence in respect of a particular instrument is given proper consideration. It is thus foreseeable that this technique will improve the reliability of analyses.

In a preferred implementation of the invention, the cumulative sell value of actor j on instrument i includes the value of the actor's long position (if any) on the instrument i. In other words, when calculating the cumulative sell value of actor j on instrument i, any number of instruments i possessed by actor j are presumed liquidated. In an analogous manner, the cumulative purchase value of actor j on instrument i includes any liability due to the actor's short position on the instrument i. This means that any short position on the instrument i is presumed covered by purchasing the necessary amount of instruments i. A benefit of this feature is use of information which otherwise would remain unavailable. This feature takes into account any unsold or shorted instruments.

In one specific implementation, the method of the first embodiment further comprises determining the cumulative sell value$_{ij}$ and/or cumulative purchase value$_{ij}$ by weighing individual transactions differently. In one implementation, the individual transactions may be weighed by a function of time between the time of the relevant transaction and the present time. For instance, more recent transactions may have a higher weight than older ones.

A time-weighted cumulative purchase value may be expressed formally as follows:

cumulative purchase value$_{ij}$ $$= \sum_{t=1}^{n} a_t \text{v\_purchase}_{ijt}$$

Herein, v\_purchase$_{ijt}$ is a value of purchase of instrument i by actor j at time t, and $a_t$ is the weight of the purchase at time t. In this example, the summing is performed over all known purchases 1 through n. Accordingly, a time-weighted cumulative sell values may be expressed as follows:

cumulative sell value$_{ij}$ $$= \sum_{t=1}^{m} a_t \text{v\_sell}_{ijt}$$

The overall amount of actor j on instrument i can be expressed as follows:

amount$_{ij}$ $$= \sum_{k=1}^{m+n} a_k t_{ijk}$$

Herein, $a_k$ is a weight of transaction k and k runs over all sell transactions m and purchase transactions n.

Instead of a time-based weighing, or in addition to it, the weighing may be based on the number and/or volume of transactions such that transactions made when the market was particularly active receive a high weight. This feature is based on the realization that data from high-activity periods tends to be more reliable than data from low-activity periods.

Another implementation of the method further comprises determining a rating for actor j, wherein said determining the rating for actor j comprises determining a market-value-weighted competence measure $C_j$ over one or more instruments i. In other words, a competence measure $C_j$ for actor j in respect of a group of instruments may be determined by weighing each instrument-specific competence measure $C_{ij}$ of actor j with the market value of instruments i. The competence measure $C_j$ for actor j in respect of a group of instruments may then be used as a rating for actor j. Or, the competence measure $C_j$ may serve as one component, out of many, for the overall ranking for actor j.

Second Embodiment

Another embodiment of the invention is a method for a data processor, for performing an analysis of one or more instruments and/or one or more actors acting on the one or more instruments in at least one market; the method comprising computing a position measure $M_{ij}$ for at least one pair of instrument i and actor j;

wherein i is an index which runs through the one or more instruments and j is an index which runs through the one or more actors;

the method further comprising determining the position measure $M_{ij}$ of actor j in respect of the at least one instrument i by calculating a value which about equals:

$$M_{ij} = \frac{\approx p_{ij}}{\approx P_j} - \frac{\approx v_i}{\approx V}, \quad \text{where}$$

$p_{ij}$=value of the position of actor j on instrument i;

$P_j$=total value of the position of actor j over all his/her instruments;

$v_i$=market value of instrument i;

V=total value of the market applied (over all instruments);

In other words, the calculation of the position measure $M_{ij}$ of actor j in respect of instrument i comprises a value which about equals a first ratio minus a second ratio. The first ratio about equals a value of the position of actor j in respect of instrument i divided by total assets of actor j. The second ratio about equals a total value of instrument i in the applied market divided by a total value of instruments in the applied market. The about signs ($\approx$) denote the fact that absolute precision is not necessary and very often not even achievable. Also, a mathematically precise difference of the two ratios is not required, and the minus sign can be replaced by any operator which returns a value which has a 0.5 or better correlation with the difference of its operands.

Similarly to the first embodiment, the second embodiment may also employ weighing based on time, the number and/or volume of transactions and/or market-value. Likewise, the $p_{ij}$ and $P_j$ values of actor j on instrument i may also include the value of the actor's long position (if any) or any liability due to the actor's short position (if any). Similarly to the first embodiment, weighing of the transactions affects the ratio of $p_{ij}$ to $P_j$.

Third Embodiment

Yet another embodiment of the invention is a method for a data processor, for performing an analysis of one or more instruments and/or one or more actors acting on the one or more instruments;

the method comprising computing a rating $R_{ij}$ for at least one pair of instrument i and actor j;

wherein i is an index which runs through the one or more instruments and j is an index which runs through the one or more actors;

the method further comprising determining the rating $R_{ij}$ based on a quantity which about equals $\Sigma P(C_{ij}, M_{ij})$, wherein $C_{ij}$ and $M_{ij}$ are a competence measure and a position measure, respectively, of the least one pair of instrument i and actor j.

A combination of the competence indicator $C_{ij}$ of actor j and the position measure $M_{ij}$ of actor j in respect of instrument i can be interpreted as follows:

|  | Actor's position on instrument | |
| --- | --- | --- |
| Actor's competence on instrument | Underweight | Overweight |
| Good | Indication negative | Indication positive |
| Poor | Indication positive | Indication negative |

In plain language this means, for example, that an instrument's indication is positive if a consistently winning actor has an overweight position on the instrument or if a consistently losing actor has a underweight position on it. Conversely, the instrument's indication is negative if the good performer has an underweight position on the instrument or the poor performer has an overweight position on it.

Naturally, the above table and the related formulas for determining one actor's position and competence measure only provide an indication in respect of a single actor. An overall indications for the instrument is determined by combining, eg by summing, the indications of all actors operating on this instrument and known to the system.

The rating $R_{ij}$, which is based on the competence measure $C_{ij}$ and position measure $M_{ij}$, is valid for actor j in respect of instrument i. A combination $\Sigma P(C_{ij}, M_{ij})$ over all actors j yields an instrument-specific rating for the instrument in question. Conversely, a combination $\Sigma P(C_{ij}, M_{ij})$ over all instruments i yields an actor-specific rating for the actor in question.

The competence measure $C_{ij}$ and position measure $M_{ij}$ of each actor j can be combined by multiplication or by any formula $P(C_{ij}, M_{ij})$ of at least two arguments such that at least one argument has a correlation of at least 0.2 with the result of the formula. The $P(C_{ij}, M_{ij})$ values can be combined by summing or by any formula $\Sigma P(C_{ij}, M_{ij})$, which formula returns a value which has a correlation of at least 0.5 with the sum of its arguments. As used herein, the expressions "correlation of at least x with the result of the formula" should be understood to mean a correlation over a representative set of input values which span the entire range of values to be expected in the system's intended use. Thus the formula $\Sigma P(C_{ij}, M_{ij})$ over all actors j can be understood as actors' competence-weighted expectations regarding the future value of instrument i.

In one specific implementation, the method of the third embodiment further comprises maintaining a quarantine criterion for one or more instruments and one or more actors; maintaining history data in respect of the one or more instruments and one or more actors; and filtering out the history data in respect of at least one instrument or actor which does not fulfil the quarantine criterion. Application of the quarantine criterion aims at filtering out potentially unreliable, poorly comparable or misleading data.

For example, the quarantine criterion in respect of an instrument may be based on at least one of: a period of time the instrument in question has been traded on a market; a number of transactions made on the instrument; and a total volume of transactions made on the instrument. This may mean, in plain language, that information relating to an instrument is considered reliable if the instrument has been traded for a reasonably long time, or in a large number of transactions and/or if the total volume of transactions on the instrument is large.

Alternatively or additionally, the quarantine criterion in respect of an actor or actor-instrument pair may be based on at least one of: a period of time the actor in question has traded on the instrument in the market; a number of transactions made by the actor; and a total volume of transactions made by the actor. In plain language this means, for example, that information relating to an actor is considered reliable if the actor has enough (but not necessarily too much) experience. The fact that an actor should not have too much experience is based on the realization that actors tend to "burn out", at least if their jobs or salaries depend on making consistent profit. For example, a quarantine criterion in respect of an actor may require that the actor has no less than about 1-2 but no more than about 6-8 years of experience. The required period of time may be instrument-specific, which means that an actor may have sufficient experience with one instrument but not with another instrument.

In another implementation, the method of the third embodiment further comprises computing a quantity which about equals (IP+IN)/(IP−IN), wherein IP and IN are quantities indicating, respectively, combinations of positive and negative indications in respect of the instrument. Herein, IP and IN denote "indication positive" and "indication negative", respectively. Since the quantity IN is a combination of negative indications, the combination also has a negative value, which means that the quantity (IP+IN)/(IP−IN) is in fact equal to a difference of the absolute values of IP and IN, divided by the sum of the absolute values of IP and IN.

In yet another implementation, the method of the third embodiment further comprises calculating a quantity which about equals $C_j * (OW_j − PAR_j)$ combined over a plurality of actors j. This implementation yields an indication as to how the competent actors evaluate the overall market. Herein, $C_j$ is an overall competence measure of actor j and about equals the competence measure $C_{ij}$ summed over all instruments i the actor has transactions on. $OW_j$ is a quantity which has at least 0.2 correlation with a ratio of the actor's capital invested in instruments of the market to the actor's total invested capital. $PAR_j$ is a "par" value, typically 50 to 75% and preferably about 60 to 65%, such that only $OW_j$ values exceeding the par value contribute positively to the quantity $C_j * (OW_j − PAR_j)$. Let us assume for a while that the quantity $OW_j$ equals a ratio of the invested capital of actor j in instruments of the market to the actor's total invested capital. In this case, the quantity $(C_j * OW_j − PAR_j)$ combined over a plurality of actors indicates a combination of each actor's competence (in respect of instruments he/she has traded) multiplied by the ratio of the actor's combined investment in instruments of the market to the actor's total invested capital, to the extent that the ratio $OW_j$ exceeds the par value $PAR_j$. The actor's total invested capital also includes investments other than instruments of this market. If competent actors collectively invest in the market in question such that the ratio $OW_j$ exceeds the par value $PAR_j$, it is a positive indication for the market in general, and vice versa. Again, a mathematically precise multiplication or difference are not necessary, and useful results are obtained by any operators which produce output values having at least 0.2 or 0.5 correlation with a product or difference, respectively, of the operands.

In yet another implementation, the method of the second embodiment further comprises generating a breadth indicator for indicating the direction of the market, wherein the generation of the breadth indicator comprises comparing the number of instruments having a positive indication to the number of instruments having a negative indication. This feature provides a further indication for the market in question as a whole.

Fourth Embodiment

Yet another embodiment of the invention is a method for a data processor, for performing an analysis of one or more instruments and/or one or more actors acting on the one or more instruments, the method comprising maintaining transaction records, each transaction record indicating at least one of said one or more instruments and one or more actors, a transaction date and data which at least implicitly indicates a number or value of the one or more instruments; and performing said analysis based on the maintained transaction records.

This embodiment is based on the surprising realization that transaction records, which contain detailed information on transactions, can be used but has not been used for performing analyses of instruments and/or actors acting on the instruments.

In addition to indicating at least one instrument and actor, the transaction records may, in various specific implementations, also indicate any of the following: date/time of transaction, number and price of traded instruments, bid, offer, seller, buyer, position of actor, position by instrument, total position of actor, market value of instrument, market value of sector/industry/business, total value of the market, total value of all markets.

In many cases the transaction records, or any kind of detailed transaction data is not readily available. In one specific implementation, the transaction records may be obtained by comparing consecutive holding data records in respect of one or more actors. In some cases transaction data may be available but in a form which is not directly usable or comparable. Accordingly, another specific implementation aims at obtaining more usable and/or comparable information by correcting the transaction records for any applicable split, reverse split, dividend, option, covered option, convertible loan, capital loan, bond, debenture, issue, redemption, bankruptcy, listing, future, merger, spin-off, delisting, and/or initial purchase offering or any comparable act which makes the instrument's price and/or amount before and after the act incomparable.

Similarly to the first embodiment, various aspects of the second through fourth embodiments comprise a data processing system comprising means for carrying out the method according to the embodiment in question. Other aspects comprise program products installable in a data processing system such that execution of the program product causes the data processing system to carry out the method according to the second through fourth embodiments.

The embodiments of the invention are not mutually exclusive. Instead, some or all embodiments may be implemented simultaneously, to produce extensive information on actors, instruments, market sectors, markets and so on.

It is readily apparent to a person skilled in the art that, as the technology advances, the inventive concept can be implemented in various ways. The invention and its embodiments are not limited to the examples described above but may vary within the scope of the claims.

The invention claimed is:

1. A method for a data processor, for performing an analysis of one or more instruments and/or one or more actors acting on the one or more instruments in at least one market, the method comprising performing the following steps by a processor:

computing a rating $R_i$ for at least one instrument i with a processor;

determining the rating $R_i$ based on a quantity which about equals $\Sigma P(C_{ij}, M_{ij})$, wherein i is an index which runs through the one or more instruments and j is an index which runs through the one or more actors;

$C_{ij}$ and $M_{ij}$ are a competence measure and a position measure, respectively, of at least one pair of instrument i and actor j;

P is a formula of at least two arguments such that at least one argument has a correlation of at least 0.2 with a result of the formula; and $\Sigma$ is an operator which returns a sum of its operands or any value which has a correlation of at least 0.5 with the sum of its operands; and generating a user-readable output from the processor of the determined rating $R_i$ as an indicator of the strength of the at least one instrument in the at least one market.

2. The method according to claim 1, further comprising computing a competence measure $C_{ij}$ for at least one pair of instrument i and actor j;

wherein said computing the competence measure $C_{ij}$ of actor j on instrument i comprises maintaining a cumulative sell value$_{ij}$ and a cumulative purchase value$_{ij}$ respectively based on sell values$_{ij}$ and/or purchase values$_{ij}$, and the method further comprises computing a value which is about equal to:

$$\frac{(\text{cumulative sell value}_{ij} - \text{cumulative purchase value}_{ij})}{\text{minimum of}}$$
$$(\text{cumulative sell value}_{ij}, \quad \text{cumulative purchase value}_{ij}).$$

3. The method according to claim 2, further comprising determining the cumulative sell value$_{ij}$ and/or cumulative purchase value$_{ij}$ by, respectively, weighing individual sell and/or purchase values and combining the weighted sell and/or purchase values.

4. The method according to claim 2, further comprising determining a rating for actor j, wherein said determining the rating for actor j comprises determining a market-value-weighted competence measure $C_j$ over one or more instruments i.

5. The method according to claim 1, further comprising computing a position measure $M_{ij}$ for at least one pair of instrument i and actor j;

the method further comprising determining the position measure $M_{ij}$ of actor j in respect of the at least one instrument i by calculating a value which about equals DIF (first ratio, second ratio), wherein DIF is an operator which returns a difference of its operands or any value which has a correlation of at least 0.5 with the difference of its operands;

the first ratio about equals a position of actor j in respect of the at least one instrument i divided by total assets of actor j, and the second ratio about equals a total value of the at least one instrument i in the at least one market divided by a total value of instruments in the at least one market.

6. The method according to claim 1, further comprising:
maintaining a quarantine criterion for the at least one or more instruments and one or more actors;
maintaining history data in respect of the one or more instruments and one or more actors; and
filtering out the history data in respect of at least one instrument or actor which does not fulfill the quarantine criterion.

7. The method according to claim 6, wherein the quarantine criterion in respect of an instrument is based on at least one of:
a period of time the instrument in question has been traded on a market;
a number of transactions made on the instrument; and
a total volume of transactions made on the instrument.

8. The method according to claim 6, wherein the quarantine criterion in respect of an actor is based on at least one of:
a period of time the actor in question has traded on the at least one instrument;
a number of transactions made by the actor; and
a total volume of transactions made by the actor.

9. The method according to claim 1, for performing an analysis of an instrument, the method further comprising computing a quantity which about equals $(IP+IN)/(IP-IN)$, wherein IP and IN are quantities indicating, respectively, combinations of positive and negative indications in respect of the instrument.

10. The method according to claim 1, for performing an analysis of a market for a plurality of instruments, the method further comprising:
calculating a quantity which about equals $C_j^*(OW_j-PAR_j)$ combined over a plurality of actors j, wherein:
$C_j$ is an overall competence measure of actor j and about equals the competence measure $C_{ij}$ summed over all instruments i the actor has transactions on; and
$OW_j$ is a quantity which has at least 0.2 correlation with a ratio of the actor's capital invested in instruments of the market to the actor's total invested capital. $PAR_j$ is a quantity describing actor's risk profile that has at least 0.2 correlation with a ratio of actor's medium exposure to instruments over longer period of time to actor's total assets.

11. The method according to claim 1, for performing an analysis of a market for a plurality of instruments, the method further comprising generating a breadth indicator for indicating the direction of the market, wherein the generation of the breadth indicator comprises comparing the number of instruments having a positive indication to the number of instruments having a negative indication.

12. The method according to claim 1, further comprising:
maintaining transaction records, each transaction record indicating at least one of said one or more instruments and one or more actors, a transaction date and data which at least implicitly indicates a number or value of the one or more instruments; and
performing said analysis based on the maintained transaction records.

13. The method according to claim 12, further comprising correcting the transaction records for any applicable split, reverse split, dividend, option, covered option, convertible loan, capital loan, bond, debenture, issue, redemption, bankruptcy, listing, future, merger, spin-off, delisting, and/or initial purchase offering.

14. A data processor, comprising:
analysis means for performing an analysis of one or more instruments and/or one or more actors acting on the one or more instruments in at least one market, the analysis means comprising:
means for computing a rating $R_i$ for at least one instrument i;
means for determining the rating $R_i$ based on a quantity which about equals $\Sigma P(C_{ij}, M_{ij})$, wherein
i is an index which runs through the one or more instruments and j is an index which runs through one or more actors;
$C_{ij}$, and $M_{ij}$ are a competence measure and a position measure, respectively, of at least one pair on instrument i and actor j;
P is a formula of at least two arguments such that at least one argument has a correlation of at least 0.2 with a result of the formula; and
$\Sigma$ is an operator that returns a sum of its operands or any value that has a correlation of at least 0.5 with the sum of its operands; and
means for generating a user-readable output of the determined rating $R_i$ as an indicator of the strength of the at least one instrument in the at least one market.

15. The data processor according to claim 14, further comprising means for computing a competence measure $C_{ij}$ for at least one pair of instrument i and actor j;
wherein said computing the competence measure $C_{ij}$ of actor j on instrument i comprises maintaining a cumulative sell value$_{ij}$ and a cumulative purchase value$_{ij}$ respectively based on sell values; purchase values$_{ij}$ and the method further comprises computing a value which is about equal to:

$$\frac{(\text{cumulative sell value}_{ij} - \text{cumulative purchase value}_{ij})}{\text{minimum of}}$$
$$(\text{cumulative sell value}_{ij}, \quad \text{cumulative purchase value}_{ij}).$$

16. The data processor according to claim 15, further comprising means for determining the cumulative sell value$_{ij}$ and/or cumulative purchase value$_{ij}$ by, respectively, weighing individual sell and/or purchase values and combining the weighted sell and/or purchase values.

17. The data processor according to claim 15, further comprising means for determining a rating for actor j, wherein said determining the rating for actor j comprises determining a market-value-weighted competence measure $C_j$ over one or more instruments i.

18. The data processor according to claim 14, further comprising means for computing a position measure $M_{ij}$ for at least one pair of instrument i and actor j; and
means for determining the position measure $M_{ij}$ of actor j in respect of the at least one instrument i by calculating a value which about equals DIF (first ratio, second ratio), wherein
DIF is an operator which returns a difference of its operands or any value which has a correlation of at least 0.5 with the difference of its operands;
the first ratio about equals a position of actor j in respect of the at least one instrument i divided by total assets of actor j, and the second ratio about equals a total value of the at least one instrument i in the at least one market divided by a total value of instruments in the at least one market.

19. The data processor according to claim 14, further comprising:
means for maintaining a quarantine criterion for the at least one or more instruments and one or more actors;
means for maintaining history data in respect of the one or more instruments and one or more actors; and
means for filtering out the history data in respect of at least one instrument or actor which does not fulfill the quarantine criterion.

20. The data processor according to claim 19, wherein the quarantine criterion in respect of an instrument is based on at least one of:
a period of time the instrument in question has been traded on a market;
a number of transactions made on the instrument; and
a total volume of transactions made on the instrument.

21. The data processor according to claim 20, wherein the quarantine criterion in respect of an actor is based on at least one of:
a period of time the actor in question has traded on the at least one instrument;
a number of transactions made by the actor; and
a total volume of transactions made by the actor.

22. The data processor according to claim 14, for performing an analysis of an instrument, the data processor further comprising means for computing a quantity which about equals (IP+IN)/(IP−IN), wherein IP and IN are quantities indicating, respectively, combinations of positive and negative indications in respect of the instrument.

23. The data processor according to claim 14, for performing an analysis of a market for a plurality of instruments, the data processor further comprising means for calculating a quantity which about equals $C_j*(OW_j-PAR_j)$ combined over a plurality of actors j, wherein:
$C_j$ is an overall competence measure of actor j and about equals the competence measure $C_{ij}$ summed over all instruments i the actor has transactions on; and
$OW_j$ is a quantity which has at least 0.2 correlation with a ratio of the actor's capital invested in instruments of the market to the actor's total invested capital. $PAR_j$ is a quantity describing actor's risk profile that has at least 0.2 correlation with a ratio of actor's medium exposure to instruments over longer period of time to actor's total assets.

24. The data processor according to claim 14, for performing an analysis of a market for a plurality of instruments, the data processor further comprising means for generating a breadth indicator for indicating the direction of the market, wherein the generation of the breadth indicator comprises comparing the number of instruments having a positive indication to the number of instruments having a negative indication.

25. The data processor according to claim 14, further comprising:
means for maintaining transaction records, each transaction record indicating at least one of said one or more instruments and one or more actors, a transaction date and data which at least implicitly indicates a number or value of the one or more instruments; and
means for performing said analysis based on the maintained transaction records.

26. The data processor according to claim 25, further comprising means for correcting the transaction records for any applicable split, reverse split, dividend, option, covered option, convertible loan, capital loan, bond, debenture, issue, redemption, bankruptcy, listing, future, merger, spin-off, delisting, and/or initial purchase offering.

27. A computer-readable medium on which is stored a computer-executable program that causes a computer to execute a method comprising:
computing a rating $R_i$ for at least one instrument i;
determining the rating $R_i$ based on a quantity which about equals $\Sigma P(C_{ij}, M_{ij})$, wherein
i is an index which runs through one or more instruments and j is an index which runs through one or more actors;
$C_{ij}$ and $M_{ij}$ are a competence measure and a position measure, respectively, of at least one pair of instrument i and actor j;
P is a formula of at least two arguments such that at least one argument has a correlation of at least 0.2 with a result of the formula; and
$\Sigma$ is an operator that returns a sum of its operands or any value that has a correlation of at least 0.5 with the sum of its operands; and
generating a user-readable output of the determined rating $R_i$ as an indicator of the strength of the at least one instrument in the at least one market.

28. The computer-readable medium according to claim 27, wherein the computer-executable program further causes the computer to compute a competence measure $C_{ij}$ for at least one pair of instrument i and actor j;
wherein said computing the competence measure $C_{ij}$ of actor j on instrument i comprises maintaining a cumulative sell value$_{ij}$ and a cumulative purchase value$_{ij}$ respectively based on sell values$_{ij}$ and/or purchase values$_{ij}$, and the method further comprises computing a value which is about equal to:

$$\frac{(\text{cumulative sell value}_{ij} - \text{cumulative purchase value}_{ij})}{\text{minimum of}(\text{cumulative sell value}_{ij}, \text{cumulative purchase value}_{ij})}.$$

29. The computer-readable medium according to claim 28, wherein the computer-executable program further causes the computer to determine the cumulative sell value$_{ij}$ and/or cumulative purchase value$_{ij}$ by, respectively, weighing individual sell and/or purchase values and combining the weighted sell and/or purchase values.

30. The computer-readable medium according to claim 29, wherein the computer-executable program further causes the computer to determine a rating for actor j, wherein said determining the rating for actor j comprises determining a market-value-weighted competence measure $C_j$ over one or more instruments i.

31. The computer-readable medium according to claim 27, wherein the computer-executable program further causes the computer to compute a position measure $M_{ij}$ for at least one pair of instrument i and actor j, and to determine the position measure $M_{ij}$ of actor j in respect of the at least one instrument i by calculating a value which about equals DIF (first ratio, second ratio), wherein DIF is an operator which returns a difference of its operands or any value which has a correlation of at least 0.5 with the difference of its operands; the first ratio about equals a position of actor j in respect of the at least one instrument i divided by total assets of actor j, and the second ratio about equals a total value of the at least one instrument i in the at least one market divided by a total value of instruments in the at least one market.

32. The computer-readable medium according to claim 27, wherein the computer-executable program further causes the computer to:
- maintain a quarantine criterion for the at least one or more instruments and one or more actors;
- maintain history data in respect of the one or more instruments and one or more actors; and
- filter out the history data in respect of at least one instrument or actor which does not fulfill the quarantine criterion.

33. The computer-readable medium according to claim 32, wherein the quarantine criterion in respect of an instrument is based on at least one of:
- a period of time the instrument in question has been traded on a market;
- a number of transactions made on the instrument; and
- a total volume of transactions made on the instrument.

34. The computer-readable medium according to claim 32, wherein the quarantine criterion in respect of an actor is based on at least one of:
- a period of time the actor in question has traded on the at least one instrument;
- a number of transactions made by the actor; and
- a total volume of transactions made by the actor.

35. The computer-readable medium according to claim 27, for performing an analysis of an instrument, wherein the computer-executable program further causes the computer to compute a quantity which about equals $(IP+IN)/(IP-IN)$, wherein IP and IN are quantities indicating, respectively, combinations of positive and negative indications in respect of the instrument.

36. The computer-readable medium according to claim 27, for performing an analysis of a market for a plurality of instruments, wherein the computer-executable program further causes the computer to calculate a quantity which about equals $C_j*(OW_j-PAR_j)$ combined over a plurality of actors j, wherein: $C_j$ is an overall competence measure of actor j and about equals the competence measure $C_{ij}$ summed over all instruments i the actor has transactions on; and $OW_j$ is a quantity which has at least 0.2 correlation with a ratio of the actor's capital invested in instruments of the market to the actor's total invested capital. $PAR_j$ is a quantity describing actor's risk profile that has at least 0.2 correlation with a ratio of actor's medium exposure to instruments over longer period of time to actor's total assets.

37. The computer-readable medium according to claim 27, for performing an analysis of a market for a plurality of instruments, wherein the computer-executable program further causes the computer to generate a breadth indicator for indicating the direction of the market, wherein the generation of the breadth indicator comprises comparing the number of instruments having a positive indication to the number of instruments having a negative indication.

38. The computer-readable medium according to claim 27, wherein the computer-executable program further causes the computer to:
- maintain transaction records, each transaction record indicating at least one of said one or more instruments and one or more actors, a transaction date and data which at least implicitly indicates a number or value of the one or more instruments; and
- perform said analysis based on the maintained transaction records.

39. The computer-readable medium according to claim 27, wherein the computer-executable program further causes the computer to correct the transaction records for any applicable split, reverse split, dividend, option, covered option, convertible loan, capital loan, bond, debenture, issue, redemption, bankruptcy, listing, future, merger, spin-off, delisting, and/or initial purchase offering.

* * * * *